United States Patent [19]
Raineri et al.

[11] 3,880,756
[45] Apr. 29, 1975

[54] METHOD AND APPARATUS FOR CONCENTRATING SLUDGE

[75] Inventors: Carlo J. Raineri, Canastota; Zoltan P. Mandy, Camillus; Michael Lesczynski, Chittenango; James S. Styron, North Syracuse; George Akerhielm, Manlius, all of N.Y.

[73] Assignee: Carrier Corporation, Syracuse, N.Y.

[22] Filed: May 1, 1973

[21] Appl. No.: 356,276

[52] U.S. Cl. .......................... 210/97; 210/10; 62/58
[51] Int. Cl. ........................................... B01d 43/00
[58] Field of Search ............ 210/97, 10, 66, 67, 68, 210/71; 62/58, 349, 351–353

[56] References Cited
UNITED STATES PATENTS

| | | | |
|---|---|---|---|
| 2,637,177 | 5/1953 | Reedall | 62/58 |
| 2,703,782 | 3/1955 | Regan et al. | 210/71 X |
| 3,597,164 | 8/1971 | Halden | 62/58 X |
| 3,713,303 | 1/1973 | Nilsson et al. | 62/58 X |
| 3,745,782 | 7/1973 | Neyhart et al. | 210/71 X |

*Primary Examiner*—Roy Lake
*Assistant Examiner*—DeWalden W. Jones
*Attorney, Agent, or Firm*—J. Raymond Curtin

[57] ABSTRACT

A sludge treatment system including a reversible refrigeration circuit with a pair of heat exchangers serving alternating and opposite functions as condensers and evaporators for sequentially freezing and thawing sludge to separate the sludge into dilute and concentrated parts. The condenser thaws sludge previously frozen and discharges the melted sludge, and raw sludge is recirculated through the evaporator to be frozen therein. Dampers associated with each heat exchanger are adjustable to direct melted sludge to a melted sludge tank and raw sludge to a raw sludge tank, depending on the function of the respective heat exchanger. The passage of sludge and refrigerant through the apparatus is regulated by a set of electrically controlled pumps and valves.

9 Claims, 3 Drawing Figures

METHOD AND APPARATUS FOR CONCENTRATING SLUDGE

BACKGROUND OF THE INVENTION

1. Field of the Invention

This invention relates to methods and apparatus for sequentially freezing and thawing sludge to effect the separation of solid constituents in the sludge from their liquid vehicle.

2. Description of the Prior Art

Various water treatment and industrial processes produce as a by-product a gelatinous substance known as sludge. Sludges are believed to constitute colloidal particles suspended in a liquid vehicle, and the solid portion of the sludge usually comprises a very small part of the sludge. Raw sludge is normally a useless waste product which is produced in substantial quantities, and its disposal can be very difficult.

An example of a widely produced sludge is the alum sludge which is a by-product of the water treatment process wherein aluminum salts are added to water to remove matter suspended therein. This matter settles out of the water as an alum precipitate constituting the sludge. The once accepted practices of dumping sludge in stagnant pools or back into the water supply are in disfavor because of the environmental damage caused thereby, and alternate means of disposal have been sought. Similar disposal problems exist for other types of sludge as well.

One of the most advantageous means of handling the sludge disposal problem has been found to be freezing and thawing the sludge, because the freeze-thaw process effects the separation of the solid constituent from its liquid vehicle (generally water). Ideally, the separated solids are removed and dried, and put to some use. Raw alum sludge of the aforementioned type is a murky, aqueous mass usually having a solid constituent concentration of less than 2% by weight. After the sludge is frozen and thawed, there is a clear demarcation between a relatively dense portion of the product comprising solid constituents which have settled from the raw sludge to form a highly concentrated sludge, and a clear portion which is relatively pure water. The separated solid constituents form from 15 to 25% by weight of the dense layer into which they have settled. The latter portion can be reprocessed to increase its concentration.

Over the past few years, various efforts have been made to render the freeze-thaw process for treating sludges efficient and economical. To this end, a system employing a reversible refrigeration cycle with a pair of falling film heat exchangers was developed and made the subject of commonly assigned, U.S. Pat. No. 3,745,782, which issued on July 17, 1973, in the name of Neyhart et al., and entitled "Sludge Separation Systems." The following commonly assigned applications were filed on even date herewith and are directed to related aspects of freeze-thaw sludge treatment systems: Ser. No. 356,235 entitled "Sludge Separation System," filed in the name of Styron et al.; Ser. No. 356,222 entitled "Method of Treating Sludge," filed in the name of James S. Styron; Ser. No. 356,258 entitled "Distributor for Sludge Treating Heat Exchanger," filed in the name of Mandy et al.; and Ser. No. 356,277 entitled "Knockout Pot for Sludge Treatment System," filed in the name of Michael Lesczynski.

SUMMARY OF THE INVENTION

An object of the present invention is to separate the solid constituents in raw sludge from their liquid vehicle in order to increase the concentration of the sludge.

Another object of the invention is to concentrate sludge in a continuous process which is capable of treating large quantities of raw sludge.

A still further object of the invention is to provide an economical and efficient system for treating sludge, the system requiring little supervision and maintenance.

Still another object of the invention is to provide a method for operating a reversible freeze-thaw sludge treating system which is efficient, economical and effective.

Other objects will be apparent from the description to follow and from the appended claims.

The present invention provides a system for sequentially freezing and thawing raw sludge to effect the separation of the sludge into concentrated and dilute parts, and the invention further provides a method which can be employed for operating the inventive system to concentrate sludge. The system comprises a reversible refrigeration circuit including a pair of heat exchangers adapted to receive and discharge sludge, a compressor, and appropriate values and pumps for controlling the circulation of refrigerant through the circuit. The heat exchangers serve alternate and opposite functions as evaporators and as condensers. The evaporator receives raw sludge which is cooled and frozen by virtue of the heat transferred from the sludge to the evaporating refrigerant. The condenser operates to thaw previously frozen sludge by virtue of the transfer of heat from the condensing refrigerant to the sludge. Melted sludge or cool water can also be circulated through the condenser to aid in the thawing process. The system further includes a raw sludge tank for supplying raw sludge to the evaporator, and for receiving for recirculation liquid raw sludge discharged from the evaporator. A melted sludge tank receives sludge discharged by the condenser, and acts as a supply for recirculated melted sludge. Dampers associated with each of the heat exchangers direct sludge discharged by the exchangers to the appropriate tanks. The direction of refrigerant flow is regulated by a series of valves disposed in the various refrigerant lines, these valves and other mechanical devices in the system being automatically controlled by various electrical switches and timers whose functioning can be regulated by the levels of sludge in the respective tanks. The system and the method for treating the sludge have been found to be very effective and efficient, and are quite capable of operating on a continuous basis to treat large quantities of sludge.

DESCRIPTION OF THE PREFERRED EMBODIMENT

The preferred system according to this invention comprises a reversible refrigeration circuit and an associated and cooperating sludge handling network. The refrigeration circuit has a pair of heat exchangers which are preferably falling film heat exchangers of the type disclosed in previously cited U.S. Pat. No. 3,745,782. One heat exchanger functions as an evaporator while the other heat exchanger functions as a condenser. Each time the direction of refrigerant flow reverses, the functions of the two heat exchangers reverse accordingly. During each phase of the refrigeration cycle, there is a first stage in which the compressor does not run but the refrigerant circulates nonetheless by virtue of a pressure differential therein. This portion of the cycle is described in more detail in previously cited Ser. No. 356,235. Tanks for receiving raw sludge and melted sludge are disposed beneath the two heat exchangers, and pivotal dampers located beneath the heat exchangers direct raw sludge and melted sludge discharged by the two exchangers to the appropriate tanks. The flow of raw sludge into the system, the circulation of sludge through the heat exchangers, and the transfer of melted sludge out of the system are regulated by electric pumps and by electrically controlled, pneumatically operated valves in coordination with the refrigerant valves and pumps.

Figure 1:
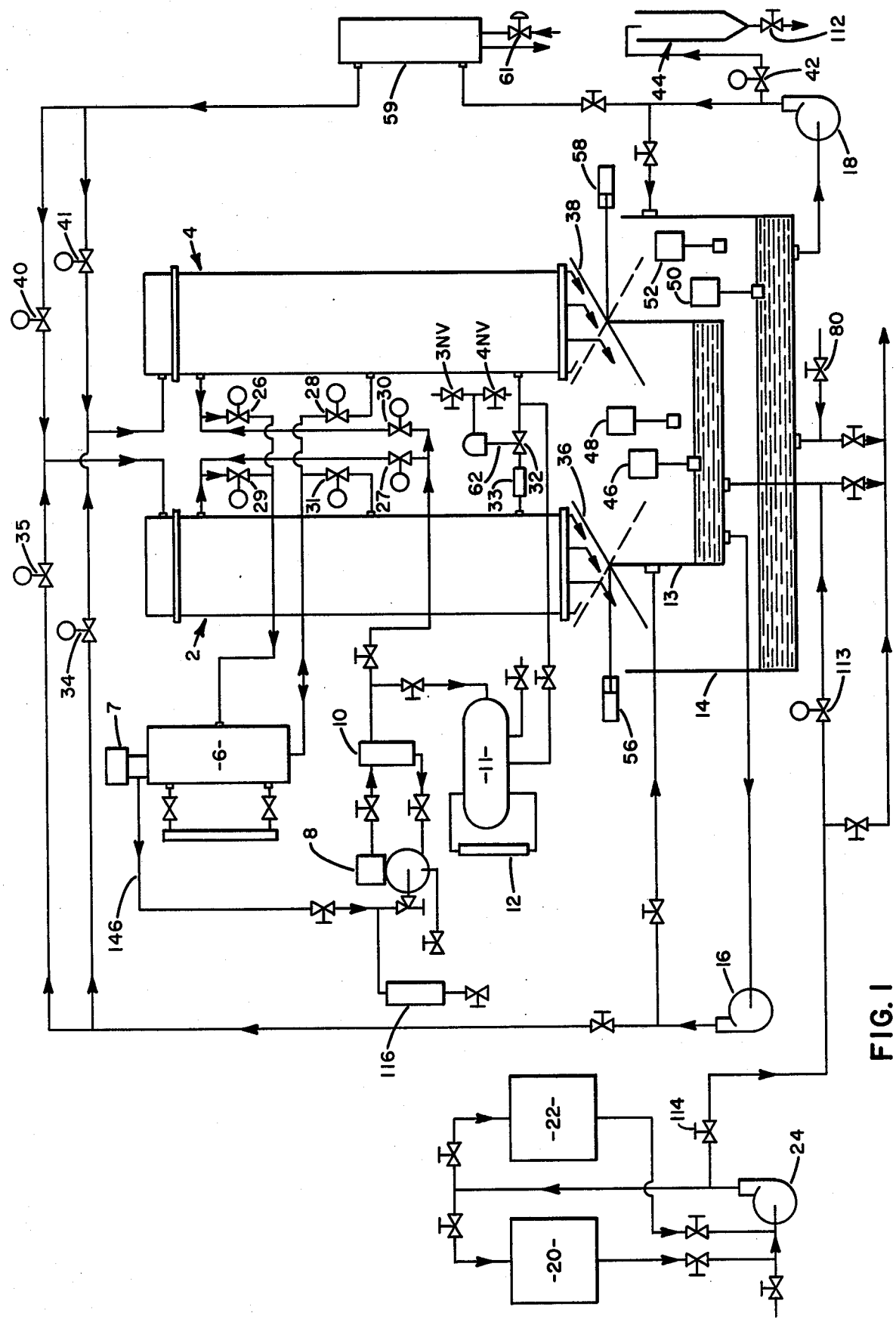
FIG. 1 is a schematic drawing of a sludge treating system according to the invention.

Referring now to FIG. 1, a sludge treatment system is shown which includes a closed refrigerant circuit and a sludge handling network. The refrigeration circuit includes a pair of identical heat exchangers 2 and 4, a refrigerant knockout pot 6, a compressor 8 and an associated oil separator 10, a refrigerant receiver 11 having a sight glass 12, a set of lines for conducting refrigerant through various flow paths as explained hereinafter, and a set of valves to be described below which control the refrigerant flow through the various lines and which operate to reverse the direction of refrigerant flow to render the circuit reversible. The sludge handling network includes a raw sludge tank 13 located beneath the two heat exchangers for receiving raw sludge discharged by either of the exchangers, a melted sludge tank 14 which is similarly disposed beneath the heat exchangers for receiving melted sludge discharged by them, a pump 16 for circulating raw sludge from the raw sludge tank through either of the heat exchangers, a pump 18 for circulating melted sludge or cool water through either of the heat exchangers or for transferring the melted sludge out of the system, a raw sludge storage tank 20 which serves as a raw sludge reservoir for the system, a raw sludge thickener tank 22 in which raw sludge is allowed to settle to permit the decanting of some relatively clear water, and a pump 24 for transferring raw sludge into the system. The various other elements, valves, lines and controls will be described hereinafter.

The general operation of the system illustrated in FIG. 1 is as follows, and a detailed description of this operation proceeds thereafter. The flow of refrigerant from compressor 8 to either of the heat exchangers, the flow from either of the heat exchangers to the other heat exchanger or to the compressor, and communication between the heat exchangers and knockout pot 6 occurs in refrigerant flow lines which can be opened or closed by valves 26 through 31 to define the various refrigerant flow paths. Compressor discharge gas is directed either through valve 27 or valve 30, while suction gas passes through either valve 26 or 29. Valves 28 and 31 are connected to the bottom of knockout pot 6 to equalize the refrigerant level in pot 6 with the level in the evaporator. When heat exchanger 2 is serving as the condenser and the system is functioning in its regular mode with compressor 8 running, valves 29, 30 and 31 are closed and valves 26, 27 and 28 are open, whereby refrigerant from the compressor is directed through valve 27 to the condensing heat exchanger 2, while low pressure refrigerant vapor is being discharged from evaporating heat exchanger 4 through valve 26 and knockout pot 6 towards compressor 8. Condensed refrigerant flows from the condensing heat exchanger 2 to evaporating heat exchanger 4 through the line controlled by valve 32. Likewise, when the functions of the heat exchangers are reversed, the conditions of valves 26–31 reverse (but during the part of the cycle when compressor 8 is shut down, valves 26–31 are open). Valves 26 through 31 can be operated automatically by float switches 46, 48, 50 and 52 which, as described hereinafter, operate in response to the level of sludge in their respective tanks. Valve 32 is advantageously controlled by a level controller 7 on knockout pot 6, which is set to maintain a liquid refrigerant level near the top of the evaporating heat exchanger. Refrigerant flow to valve 32 can be observed through a sight glass 33. Knockout pot 6 also functions to remove refrigerant liquid from the compressor gas stream, and is described fully in U.S. application Ser. No. 356,277 cited earlier.

The purpose of the system is to freeze and subsequently thaw sludge to effect the separation of solid constituents in the sludge from their liquid vehicle. Accordingly, raw sludge is fed to the evaporating heat exchanger where it is placed in a heat exchange relationship with evaporating refrigerant so that heat is transferred from the sludge to the refrigerant. In order to accomplish the foregoing, pump 16 delivers raw sludge from tank 13 through appropriate sludge lines to the evaporating heat exchanger. Raw sludge from pump 16 can follow alternate flow paths through the sludge lines controlled respectively by valves 34 or 35. When valve 34 is open and valve 35 is closed, raw sludge is directed to heat exchanger 4, whereas when valve 35 is open and valve 34 is closed, heat exchanger 2 receives the raw sludge. Valves 34 and 35 are automatically operated by float switches 46, 48, 50 and 52 in coordination with other valves controlled by these same switches.

Since all of the raw sludge fed to the evaporator will not freeze, it is desirable to recirculate the unfrozen raw sludge. (The term "raw sludge" as used herein refers to any sludge which has not yet been frozen.) For reasons which shall be explained below, it is also desirable to recirculate melted sludge discharged from the condensing heat exchanger. Hence, it is advantageous to direct raw sludge discharged by the evaporator to raw sludge tank 13, and to direct melted sludge discharged by the condenser to melted sludge tank 14. Accordingly, dampers or baffles 36 and 38, one associated with each heat exchanger, are pivotally mounted in the discharge paths of each of the heat exchangers, and are selectively displaceable for directing raw sludge to tank 13 and melted sludge to tank 14. When heat exchanger 2 is the condenser, and heat exchanger 4 is the evaporator, dampers 36 and 38 are positioned as shown by the solid lines. Dampers 36 and 38 are movable by damper operators 56 and 58, which can be electrically actuated air pistons. Damper operators 56 and 58 can be controlled by electrical timers which coordinate the operation of operators 56 and 58 with the operation of other components of the system.

The condenser should function to melt sludge previously frozen in the heat exchanger and to discharge that sludge for settling or subsequent treatment. Hot, pressurized refrigerant circulating through the condenser gives off heat to the frozen sludge, and causes the sludge to melt. In order to facilitate and expedite the melting of the frozen sludge, melted sludge can be pumped from tank 14 to the condensing heat exchanger by pump 18 (if an insufficient quantity of melted sludge is available, as during start up, cool water can be admitted to tank 14 through valve 80). Depending on which of valves 40 and 41 are open (the other valve being closed) melted sludge from tank 14 is directed to one of the two heat exchangers. When heat exchanger 2 is the condenser, valve 40 is open and valve 41 is closed, whereas when heat exchanger 4 is the condenser, valve 41 is open and valve 40 is closed. The operation of valves 40 and 41 can be automatically controlled by float switches 46, 48, 50 and 52 as mentioned elsewhere with reference to other valves and the two dampers. The melted sludge flows down the condensing heat exchanger in direct contact with the sludge ice therein, and the combined transfer of heat from the condensing refrigerant and from the melted sludge to the frozen sludge causes the ice to melt. The damper at the base of the condensing heat exchanger directs the melting sludge into melted sludge tank 14.

When the desired amount of sludge is frozen in the evaporating heat exchanger, pump 16 is shut down to conserve power and to prevent the needless circulation of raw sludge. Pump 18 is usually run after the shutting down of pump 16, because the ice in the condenser has been found to melt substantially sooner than a like amount of sludge freezes in the evaporator, so that the recirculating melted sludge absorbs heat from the condensing refrigerant. A cooler 59 can be provided in the discharge line of pump 18, for cooling the water fed to the condenser, by means of a coolant admitted through a valve 61. Valve 42, which controls the flow through a sludge line leading from the output side of pump 18, can be opened at this time through the action of float switches 52 to direct a predetermined quantity of melted sludge from the system to a surge tank 44, from whence it can pass at a slow rate through a valve 112 to settling tanks (not shown) or to a subsequent processing station.

It has been found to be advantageous to subcool the sludge ice in the evaporating heat exchanger after pump 16 is shut down because greater separation of the sludge occurs, possibly due to an increased breakdown of the lattice structure of the sludge. Therefore, compressor 8 is run for a predetermined period after pump 16 shuts down. This is an appropriate time to open valve 42 for transferring a predetermined charge of raw sludge into tank 44.

Preparations are made to reverse the roles of the heat exchangers when sludge in the evaporator has frozen sufficiently and compressor 8 has stopped. Pump 18 is shut down just prior to the reversal of the system to prevent any melted sludge from being carried over into tank 13 when dampers 36 and 38 reverse their positions. At this time, the system is reversed. A stage of the new phase of the cycle is run wherein compressor 8 is shut down, valves 26–31 are opened, and refrigerant vapors are transferred by virtue of the refrigerant pressure differential existing between the two heat exchangers (as described in previously cited Ser. No. 356,235. The conditions of the pairs of valves 34 and 35, and 40 and 41 are reversed to switch the heat exchangers to which the raw and melted sludge flows. Dampers 36 and 38 are switched in accordance with the changing roles of heat exchangers 2 and 4. Raw sludge pump 16 is reactivated and raw sludge, now being pumped to the new evaporator, is cooled by evaporating refrigerant while the sludge ice in the new condenser begins to melt. When the pressure differential of the refrigerant becomes insufficient to drive the refrigerant through its operating circuit, the appropriate valves 26–28 or 29–31 are closed, and compressor 8 is restarted. The refrigerant proceeds through its normal cycle to freeze sludge in the new evaporator and to melt sludge in the new condenser.

OPERATION

Figure 2:
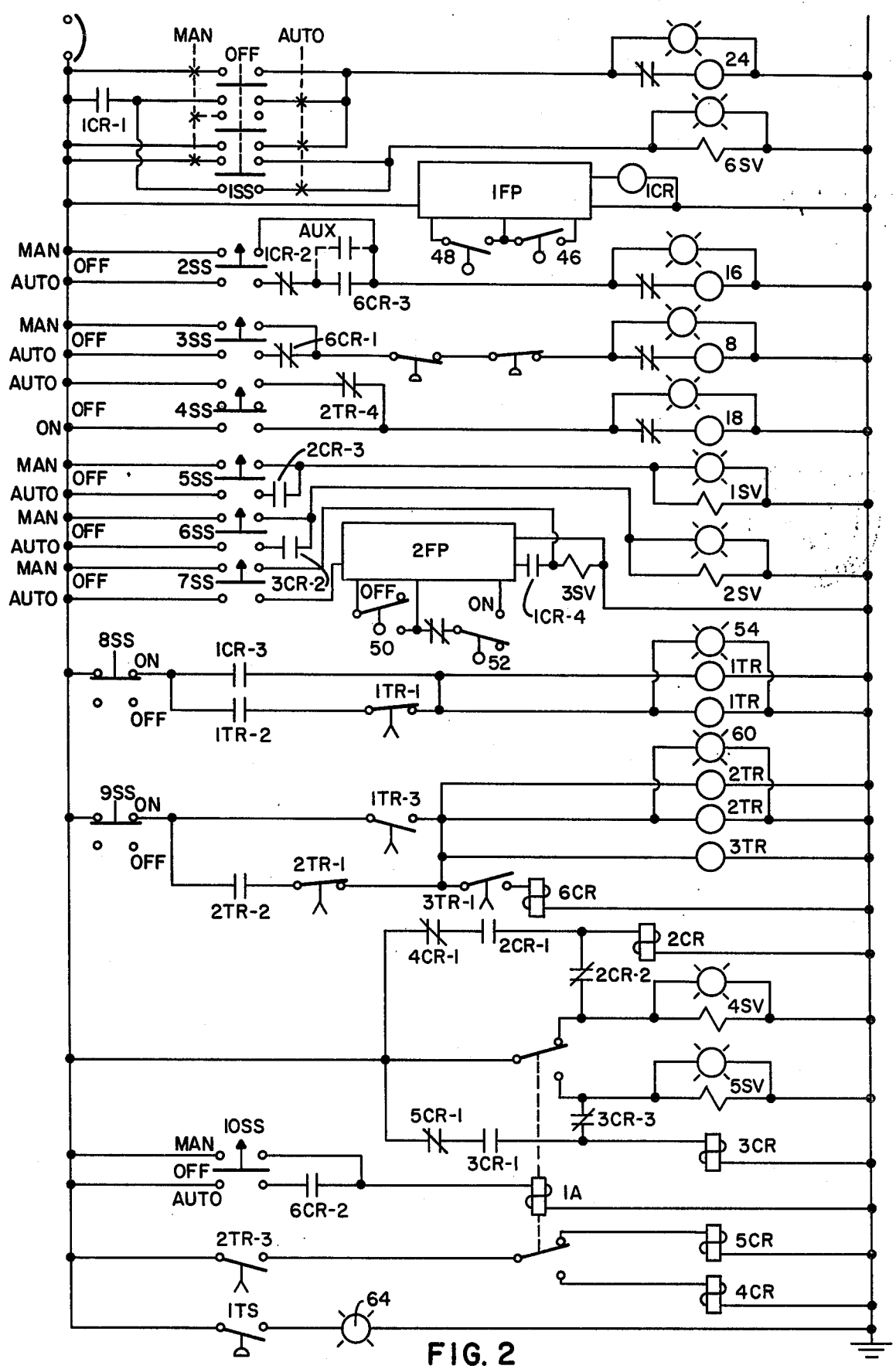
FIG. 2 shows in schematic form the electrical circuitry for controlling the operation of the various valves, pumps, and dampers shown in FIG. 1.

The description to follow refers to the system shown in FIG. 1 and to the electrical control circuit illustrated in FIG. 2, and sets forth the operation of the illustrated preferred embodiment of the invention. The system will first be considered in the course of its normal, automatic operation. When the system is operating in its automatic mode, switches 1SS–1OSS are set in the positions designated by the terms "AUTO" or "ON" in FIG. 2. During the course of a normal running cycle of the system, a predetermined quantity of raw sludge is frozen in the one of heat exchangers 2 and 4 functioning as the evaporator. This raw sludge was fed to that heat exchanger from tank 13, and low level float switch 46 has been set to generate a signal in response to the dropping of the sludge level in tank 13 by the amount corresponding to that predetermined quantity of sludge. The signal generated by float level switch 46 effects the energization of the coil of control relay 1CR through a flip-pak 1FP, which in turn closes normally open contact 1CR-1 both to start transfer pump 24 and to energize solenoid valve 6SV, causing pneumatic valve 113 to open. (The energization of relay 1CR also effects other operations as described below.) Pump 24 delivers raw sludge from thickener tank 22 through manually opened sludge line valve 114 and valve 113 to raw sludge tank 13. Pump 24 continues to run until a predetermined charge has been delivered to tank 13, at which time high level float switch 48 closes to de-energize the coil of control relay 1CR through flip-pak 1FP. The latter occurrence turns pump 24 off.

When pump 24 is activated, the normally closed contact 1CR-2 opens to shut down pump 16 which had been delivering raw sludge to the evaporator. Thus, raw sludge pump 16 is off while pump 24 is transferring a new charge of raw sludge to tank 13. Pump 16 remains inactive until normally open contact 6CR-3 closes, which as explained below occurs a predetermined period of time after pump 16 shuts down. Pump 16 does not reactivate until presently running compressor 8 stops and dampers 36 and 38 reverse their positions.

As indicated earlier, compressor 8 continues to run even though no more raw sludge is fed to the evaporator by pump 16. This is done to subcool the sludge frozen in the evaporator. To accomplish this, a pair of timers 1TR and 2TR are employed. When control relay 1CR is energized (by low level float switch 46), normally open contact 1CR-3 closes to energize timing motor 1TR. A timed contact 1TR-1 enables the latter motor to time for the period for which compressor 8 is to run after pump 16 shuts down. Contact 1CR-3 opens as soon as raw sludge tank 13 is filled to a predetermined level, but timing motor 1TR is kept running by the closing of normally open contact 1TR-2. An indicator lamp 54 mounted on a control panel (not shown) is connected in parallel with timing motor 1TR, so that it is lit whenever this motor is running.

Upon the termination of the predetermined period for which motor 1TR was set, normally open timed contact 1TR-3 closes to thereby activate timing motor 2TR and timer 3TR. When timing motor 2TR is energized, normally open contact 2TR-2 closes and remains closed until timed contact 2TR-1 opens a predetermined period of time later. Upon the energization of motor 2TR, normally closed contact 2TR-4 opens, thereby shutting down melted sludge pump 18. The opening of contact 2TR-1 shuts off timing motor 2TR.

For a brief, predetermined period of time following the energization of timer 3TR (effected by the closing of contact 1TR-3), timed contact 3TR-1 is open to delay energizing coil 6CR. The delay in closing contacts 3TR-1 therefore delays the switching of dampers 36, 38 so as to prevent them from carrying melted sludge still flowing from the evaporator, over to the raw sludge tank. Moreover, it has been found that melted sludge continues to flow through the condenser for a short period following the shutting down of melted sludge pump 18, and the foregoing advanced action of timer motor 2TR (relative to the closing of contacts 3TR-1) effectively stops the discharge of melted sludge from the condensing heat exchanger just prior to reversal of the refrigeration cycle. Hence, when the latter heat exchanger becomes the evaporator there will be no melted sludge residue therein from the preceding phase of the cycle.

The energization of control relay 6CR occurs when timed contact 3TR-1 closes. This occurrence both breaks normally closed contact 6CR-1 to deactivate compressor 8, and simultaneously closes normally open contact 6CR-3 to restart raw sludge pump 16. A predetermined period later, contact 6CR-3 reopens, but pump 16 continues to run by virtue of the auxiliary contact interlock designated "AUX" in FIG. 2. Thus, raw sludge pump 16 starts delivering raw sludge to the heat exchanger functioning as the evaporator at the same time that compressor 8 is shut down.

The completion of each phase of the refrigeration cycle is signaled by the closing of high level float switch 52 in the melted sludge tank. This is brought about by a rise in the level in tank 14 resulting from melted sludge discharged from the condenser. Switch 52 is set to close at a level determined by the capacity of the heat exchangers, and the desired batch size of sludge being treated. The closing of switch 52 energizes the "ON" circuit of flip-pak 2FP. The closing of normally open contact 1CR-4 energizes solenoid valve 3SV, thereby completing the circuit for opening sludge control valve 42. Since melted sludge pump 18 is running at this time, a predetermined quantity of melted sludge is transferred to surge tank 44. The amount of sludge so transferred is controlled through the action of low level float switch 50.

Switch 50 is set to close when the level of melted sludge in tank 14 drops by a distance indicating that the aforementioned predetermined quantity was transferred to surge tank 44. The closing of switch 50 energizes the "OFF" circuit of flip-pak 2FP and de-energizes solenoid valve 3SV.

Shortly after the closing of float switch 50, high level float switch 48 in the raw sludge tank de-energizes the coil of control relay 1CR. This action effects the opening of contact 1CR-4. It can be noted that even while valve 42 controlling the line leading to surge tank 44 is open, melted sludge pump 18 continues to deliver some melted sludge to the condenser.

When compressor 8 shuts down and raw sludge pump 16 restarts through the energization of control relay 6CR, normally open contact 6CR-2 simultaneously energizes switching relay 1A. The energization of switching relay 1A pulls the contacts of this relay from the upper contact position to the lower contact position as shown in the drawing. This action initiates a subsequent sequence of actions.

First, the energization of switching relay 1A energizes solenoid valve 5SV to open valve 35 (to open a raw sludge line to heat exchanger 2), valve 41 (to open a melted sludge line to heat exchanger 4), and finally to energize the damper operator 56 which functions to switch the position of damper 36 to its dotted line position.

Next, the energization of relay 1A de-energizes solenoid valve 4SV to close valve 34 (to close the raw sludge line leading to heat exchanger 4), to close valve 40 (to close the melted sludge line leading to heat exchanger 2) and to activate the damper operator 58 to switch damper 38 to its dotted line position. The effect of the latter switching action is to reverse the functions of the two heat exchangers so that heat exchanger 2 becomes the evaporator and heat exchanger 4 becomes the condenser. Dampers 36 and 38 have been switched to their new positions prior to the start of the flow of raw sludge to heat exchanger 2. Because of the delay in the energizing of control relay 6CR described earlier, melted sludge stopped flowing from heat exchanger 2 a short period prior to this switching of dampers.

The foregoing energization of switching relay 1A further results in the switching of the lower contact of the relay 1A from the connection to control relay 5CR to the connection to control relay 4CR. The effect of the latter switching action is delayed for a predetermined period of time because a timed contact 2TR-3 is in its open position at the commencement of this switching action and does not close until timing motor 2TR has timed for a preset period. Control relay 4CR effects the energization of means for closing refrigerant valves 26-28, and energization of control relay 5CR effects the closing of refrigerant valves 29-31. When both of control relays 4CR and 5CR are de-energized (while timed contacts 2TR-3 are open), refrigerant valves 26-31 are open, so that the refrigerant levels in heat exchangers 2 and 4 can equalize during the timing of motor 2TR. This is the first phase of the cycle and compressor 8 is off.

Control relay 3CR is included in the circuit to assure that refrigerant valves 29-31 will remain open throughout the first stage of each phase of the cycle. Accordingly, control relays 4CR and 5CR are provided with contacts in solenoid valve circuits 4SV and 5SV which control the sludge valves leading to heat exchangers 2 and 4 and dampers 36 and 38. During the first stage of each phase, contacts 4CR-1 and 5CR-1 are in their normally closed positions. When the contacts of relay 1A drop to their lower positions, solenoid valve 5SV is energized, and control relay 3CR is therefore energized through normally closed contact 3CR-3. The energizing of control relay 3CR closes normally open contacts 3CR-1 just before normally closed contact 3CR-3 is opened. This insures that control relay 3CR is to be energized during the foregoing first stage. Therefore, normally open contact 3CR-2 is closed to energize solenoid valve 2SV to open refrigerant valves 29-31.

As indicated above, the switching of relay 1A to the 5SV, 4CR position, also causes refrigerant valves 26-28 to remain open throughout the first stage of each phase of the cycle. When the upper contact of relay 1A moves to the 5SV position, control relay 2CR remains energized through normally closed contact 4CR-1 and normally open contact 2CR-1. Control relay 2CR remains energized throughout this stage until control relay 4CR is energized and opens normally closed contact 4CR-1. When control relay 2CR is energized, normally open contact 2CR-3 is closed, energizing solenoid valve 1SV to open refrigerant valves 26-28.

Upon the termination of the first stage, it is necessary to restart compressor 8 and melted sludge pump 18. After timer 2TR has timed for the predetermined period of the first stage, timed contact 2TR-3 closes, thereby energizing control relay 4CR. The energizing of control relay 4CR opens normally closed contact 4CR-1 to de-energize control relay 2CR. This causes the opening of normally open contact 2CR-1 and further causes the closing of normally closed contact 2CR-2 to prime this circuit for the next switch over. De-energizing control relay 2CR also causes the opening of normally open contact 2CR-3 to cut power from solenoid valve 1SV. This effects the closing of refrigerant valves 26-28. Hence, the refrigerant valves are set in the proper condition for compressor 8 to be restarted. Shortly after valves 26-28 have closed, timed contact 2TR-1 opens to break the 2TR timing circuit and to cause the opening of normally open contact 2TR-2, thus de-energizing control relay 6CR. The de-energization of control relay 6CR causes the closing of normally closed contact 6CR-1 which in turn starts up compressor 8. An indicator light on the control panel (not shown) can be wired in parallel with timing motor 2TR to light whenever this motor is timing.

At this time, compressor 8 is running, and the various valves and the dampers are in their proper positions so that the normal cycle can continue until it is terminated by the closing of low level switch 46 in raw sludge tank 13.

Figure 3:
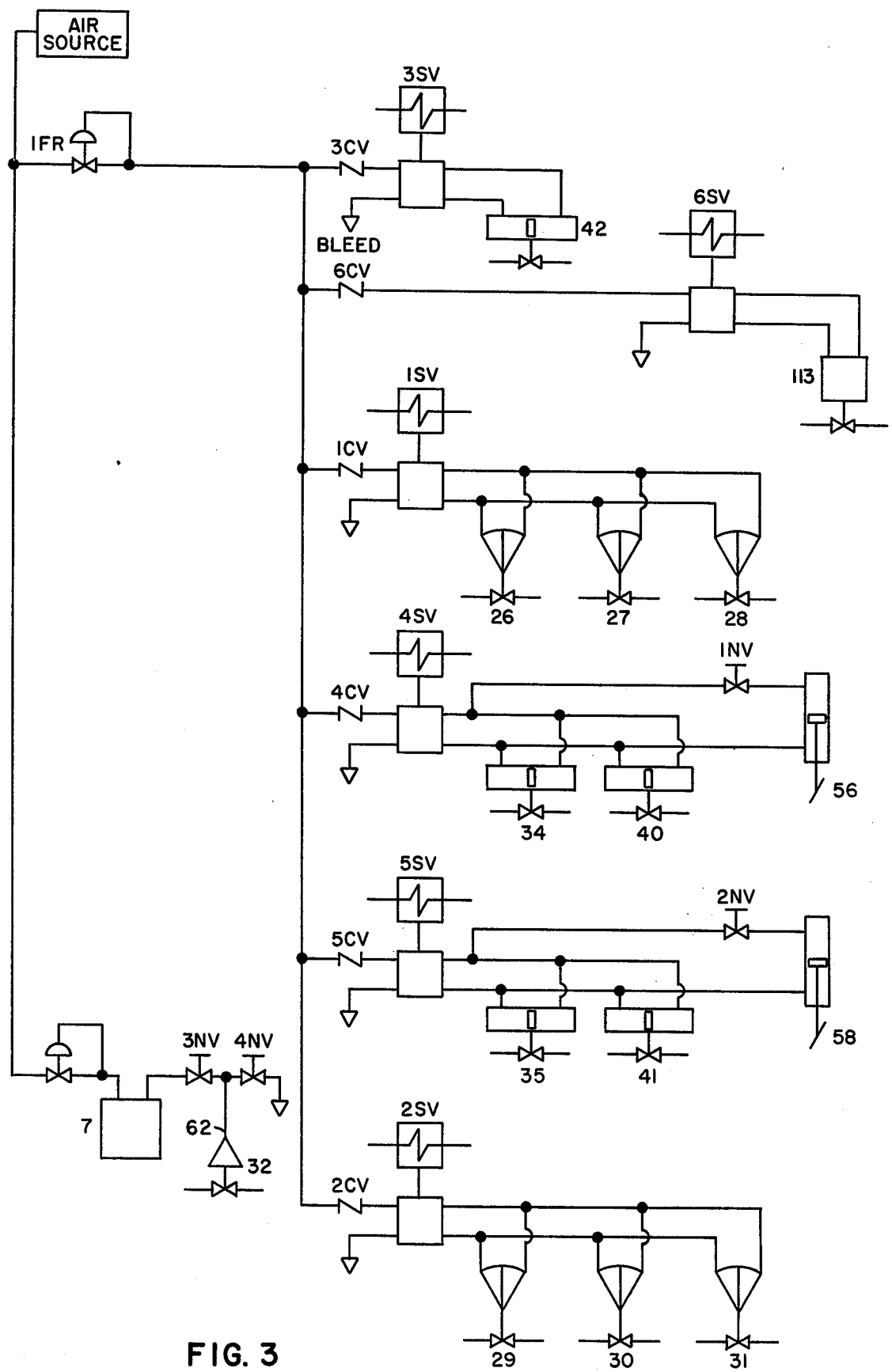
FIG. 3 shows in schematic form the pneumatic circuit for the pneumatically operated components of the system in FIG. 1.

Referring to FIG. 3, the electrically controlled, pneumatic circuit for operating various refrigerant and sludge valves is shown. A source of air at a relatively high pressure (90 psi for example) is reduced (to 60 psi) by a filter regulator 1FR. The pressurized air passes through check valves 1CV-6CV to the various valves. Thus, air passing through check valve 3CV drives an air piston for operating sludge line valve in response to a signal generated by solenoid valve 3SV. Air from check valve 6CV operates sludge line valve 113 under the control of solenoid valve 6SV. Refrigerant valves 26-31, which are shown as double action pneumatic valves, are actuated by air from check valves 1CV and 2CV in response to signals from solenoid valves 1SV and 2SV as indicated. Air pistons for actuating sludge line valves 34, 40, and damper operator 56 are operated by air from check valve 4CV, and pistons for operating sludge line valves 35, 41 and damper operator 58 are similarly operated by air from check valve 5CV. It is contemplated that these air pistons are slidably mounted in piston cylinders, and that pressurized air is applied to one side of the piston while the solenoid valve associated therewith bleeds air from the other side of the piston to the atmosphere. Check valves 1CV-6CV are installed such that when any bank of valves suddenly calls for supply air, this supply air will be taken through a main filter regulator 1FR and will not cause any momentary bleeding pressure from any of the other valves.

Damper operators 56 and 58 can be provided with needle valves in their pneumatic circuit to act as adjustable orifices so that the action of the damper motors can be slowed down to prevent a slamming action against the collecting funnels (not shown) at the bottoms of the heat exchangers. Needle valves 3NV and 4NV are used for bleeding off the air pressure on valve 32 while maintaining air pressure throughout the rest of the pneumatic circuit. After the pressure has been bled off valve 32, the valve automatically moves to a closed position to prevent refrigerant from flowing into the evaporator. This feature is particularly advantageous when first starting up the system because the possibility does exist that refrigerant may boil to the top of knockout pot 6 and then be carried down the suction line to compressor 8. After this condition has been alleviated, the needle valves must be readjusted so that valve 32 again has air pressure acting upon it. A pneumatically controlled switch 1TS (FIG. 2) in air line 62 leading to valve 32 is set to close at a predetermined pressure to light an indicator light 64 in the control panel (not shown) whenever valve 32 is opened.

It will be apparent that the invention described herein fully achieves the objects set forth earlier. The system described herein is capable of freezing and thawing sludge in a continuous process rendering it useful for large quantities of raw sludge. Operation of the system requires little or no supervision by an attendant by virtue of the many automatic features therein. The system is thus efficient, economical, and effective. Moreover, the system is believed to be a major advance in the art of sludge treatment.

The invention has been described in detail with particular reference to a preferred embodiment thereof, but it will be understood that variations and modifications can be effected within the spirit and scope of the invention.

We claim:

1. Apparatus for increasing the concentration of raw sludge, said apparatus comprising:
    first and second heat exchangers for holding refrigerant and sludge in heat exchange relationship to freeze and subsequently thaw sludge fed to the heat exchangers, each heat exchanger having means for receiving and discharging sludge and refrigerant;
    means for holding raw sludge discharged from said heat exchangers;
    means for holding melted sludge discharged from said heat exchangers;
    a reversible refrigeration system for circulating refrigerant through one of said heat exchangers for evaporation to freeze sludge in said heat exchanger and for circulating refrigerant through the other heat exchanger for condensation to melt sludge previously frozen in said other heat exchanger, said refrigeration system including refrigerant flow reversing means for reversing the direction of flow of the refrigerant to switch the functions of said heat exchangers;

means associated with each of said heat exchangers for directing sludge discharged from the evaporating heat exchanger to said raw sludge holding means, and for directing sludge discharged from the condensing heat exchanger to said melted sludge holding means;

raw sludge transferring means for selectively transferring raw sludge from said raw sludge holding means to the heat exchanger wherein refrigerant is evaporating to freeze the sludge in said evaporating heat exchanger; and means for transferring melted sludge from said melted sludge holding means to the heat exchanger wherein refrigerant is condensing to melt the sludge previously frozen therein when said condensing heat exchanger was operating as an evaporating heat exchanger.

2. Apparatus according to claim 1 and further including means for actuating said refrigerant flow reversing means in response to the freezing of a predetermined amount of sludge in the evaporating heat exchanger.

3. Apparatus according to claim 1 wherein said raw sludge holding means comprises a raw sludge tank positioned to receive raw sludge discharged from either of said heat exchangers, said apparatus further including means for actuating said refrigerant flow reversing means and said raw sludge transferring means in timed response to a decrease to a predetermined level of raw sludge in said raw sludge tank.

4. Apparatus according to claim 1 and further comprising:

means for supplying raw sludge to said raw sludge holding means;

means for activating said raw sludge supplying means in timed response to a predetermined low level of raw sludge in said raw sludge holding means; and means for deactivating said raw sludge supplying means in response to a predetermined high level of sludge in said raw sludge holding means.

5. Apparatus according to claim 1 wherein said melted sludge holding means comprises a melted sludge tank for receiving melted sludge discharged from either of said heat exchangers, and said apparatus further includes melted sludge transferring means for transferring a predetermined quantity of melted sludge from said melted sludge tank and out of the apparatus for settling, and level sensing means for activating said melted sludge transferring means in response to a predetermined high level of melted sludge in said melted sludge tank and for deactivating said melted sludge transferring means in response to a predetermined low level of melted sludge in said melted sludge tank.

6. Apparatus according to claim 1 wherein said discharged sludge directing means comprises damper means associated with each of said heat exchangers, each of said damper means having a first position for diverting melted sludge discharged from its associated heat exchanger when operating as a condensing heat exchanger to said melted sludge holding means and a second position for diverting raw sludge discharged from its associated heat exchanger when operating as an evaporating heat exchanger to said raw sludge holding means, and switching means for switching the positions of said damper means when the functions of said heat exchangers reverse.

7. Apparatus according to claim 6 and further including means for delaying the actuation of said switching means until the discharge of sludge from said heat exchangers has ceased.

8. Apparatus according to claim 7 wherein said raw sludge holding means and said melted sludge holding means comprise adjacent raw and melted sludge tanks, and said damper means comprise dampers pivotally mounted near their associated heat exchanger for alternately directing sludge discharged by their associated heat exchanger to the raw sludge tank when the discharged sludge is raw sludge and to the melted sludge tank when the discharged sludge is melted sludge.

9. For use in apparatus including a reversible refrigeration system having a pair of heat exchangers for holding circulating sludge and refrigerant in heat exchange relationships; and receptacles for receiving raw and melted sludge respectively discharged from each of the heat exchangers; a method of concentrating sludge, said method comprising the steps of:

a. circulating refrigerant vapor through one heat exchanger to condense the refrigerant by transferring heat to sludge previously frozen in said one exchanger for melting the frozen sludge, and passing liquid refrigerant through the other heat exchanger to evaporate the refrigerant by absorbing heat from liquid sludge in said other exchanger for freezing the liquid sludge;

b. feeding raw liquid sludge from the raw sludge receptacle to said other heat exchanger to be frozen by transferring heat to refrigerant evaporating in said other heat exchanger;

c. directing raw sludge discharged from the evaporating heat exchanger to the raw sludge receptacle, and directing melted sludge discharged from the condensing heat exchanger to the melted sludge receptacle;

d. replenishing the raw sludge removed from the raw sludge receptacle;

e. reversing the direction of refrigeration circulation to switch the functions of the heat exchangers, and switching the respective sludge flow paths to the heat exchangers in response to predetermined changes of the levels of sludge in the receptacles;

f. transferring at least a portion of melted sludge from the melted sludge receptacle for subsequent treatment or disposal; and g. repeating the preceding steps.

* * * * *